United States Patent
Shimizu et al.

(10) Patent No.: US 10,202,005 B2
(45) Date of Patent: Feb. 12, 2019

(54) PNEUMATIC TIRE

(71) Applicant: The Yokohama Rubber Co., LTD., Minato-ku, Tokyo (JP)

(72) Inventors: Masatoshi Shimizu, Hiratsuka (JP); Masatoshi Kuriyama, Hiratsuka (JP); Masaki Sato, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 515 days.

(21) Appl. No.: 14/387,412

(22) PCT Filed: Mar. 1, 2013

(86) PCT No.: PCT/JP2013/055629
§ 371 (c)(1),
(2) Date: Sep. 23, 2014

(87) PCT Pub. No.: WO2013/140999
PCT Pub. Date: Sep. 26, 2013

(65) Prior Publication Data
US 2015/0047762 A1    Feb. 19, 2015

(30) Foreign Application Priority Data
Mar. 23, 2012  (JP) ................. 2012-067385

(51) Int. Cl.
*B60C 11/00* (2006.01)
*B60C 11/03* (2006.01)

(52) U.S. Cl.
CPC ...... *B60C 11/0058* (2013.01); *B60C 11/0008* (2013.01); *B60C 11/03* (2013.01);
(Continued)

(58) Field of Classification Search
CPC ......... B60C 11/0058; B60C 2011/0348; B60C 2011/0025
See application file for complete search history.

(56) References Cited

U.S. PATENT DOCUMENTS 5,355,922 A * 10/1994 Kogure ............... B60C 9/26
152/209.18
6,331,605 B1 * 12/2001 Lunginsland ......... C08G 77/48
523/213
(Continued)

FOREIGN PATENT DOCUMENTS

JP  S56-146404     11/1981
JP  61-071203 A *  4/1986
(Continued)

OTHER PUBLICATIONS

Machine translation for Japan 11-208216 (no date).*
(Continued)

*Primary Examiner* — Steven D Maki
(74) *Attorney, Agent, or Firm* — Thorpe North & Western (57) ABSTRACT

The present technology provides a pneumatic tire that combines rolling resistance and wet grip performance while suppressing the occurrence of uneven wear. The pneumatic tire of the present technology has a cap rubber divided into a center portion that straddles a tire equator line and shoulder portions positioned on both sides thereof, a compound emphasizing wet grip performance and having a tan δ at 0° C. higher than that of the shoulder portions is disposed in the center portion and a compound emphasizing rolling resistance and having a tan δ at 60° C. lower than that of the center portion is disposed in both shoulder portions, and circumferential narrow grooves are formed on the respective shoulder sides of outermost main grooves in both the shoulder portions.

20 Claims, 2 Drawing Sheets

(52) U.S. Cl.
CPC ... *B60C 11/0309* (2013.01); *B60C 2011/0025* (2013.01); *B60C 2011/0348* (2013.01); *B60C 2011/0351* (2013.01); *Y02T 10/862* (2013.01)

(56) References Cited

U.S. PATENT DOCUMENTS

| | | | | |
|---|---|---|---|---|
| 2004/0112490 A1* | 6/2004 | Sandstrom | ............. | B60C 11/18 152/152.1 |
| 2004/0118495 A1* | 6/2004 | Sandstrom | ............ | B60C 1/0016 152/209.5 |

FOREIGN PATENT DOCUMENTS

| | | | |
|---|---|---|---|
| JP | 61-020441 B2 | * | 5/1986 |
| JP | 02-249706 A | * | 10/1990 |
| JP | H02-249706 | | 10/1990 |
| JP | 04-085108 A | * | 3/1992 |
| JP | H06-262907 | | 9/1994 |
| JP | 07-228106 A | * | 8/1995 |
| JP | 11-208216 A | * | 8/1999 |
| JP | H11-208216 | | 8/1999 |
| JP | 2003-226114 | | 8/2003 |
| JP | 2006-240507 | | 9/2006 |
| JP | 2007-045273 | | 2/2007 |
| JP | 2008-024045 | | 2/2008 |

OTHER PUBLICATIONS

Machine translation for Japan 02-249706 (no date).*
Machine translation for Japan 61-020441 B2 (no date).*
Machine translation for Japan 61-071203 (no date).*
Machine translation for Japan 04-085108 (no date).*
Machine translation for Japan 07-228106 (no date).*
International Search Report for International Application No. PCT/JP2013/055629 dated Jun. 4, 2013, 4 pages, Japan.

* cited by examiner

PNEUMATIC TIRE

TECHNICAL FIELD

The present technology relates to pneumatic tires and more specifically relates to a pneumatic tire combining rolling resistance and wet grip performance while suppressing the occurrence of uneven wear in a pneumatic tire in which compounds with different physical properties are disposed in a center region and in both shoulder regions of a tread portion.

BACKGROUND

Generally, a reduction in loss of viscosity in the cap tread is often addressed by using a rubber that emphasizes rolling resistance and has a low tan δ at 60° C. in the cap rubber that configures the tread portion as a method for reducing rolling resistance of a tire. However, this type of tire leads to the problem of a reduced grip performance on wet road surfaces and recently there has been a strong demand for measures to improve wet grip performance.

Conversely, the preferable use of rubber emphasizing wet grip performance with a high tan δ at 0° C. as the cap rubber is known as a measure for improving wet grip performance of a tire. However, because there are limitations to obtaining a compound that has both a high tan δ at 0° C. and a low tan δ at 60° C. at the same time from a technical standpoint, the problem arises that it is extremely difficult to address the above demand by using a single compound as the cap rubber.

Conventionally, the disposition of rubbers having a plurality of types of different physical properties in the tire width direction of the cap rubber has been proposed in order to meet the required performance in a pneumatic tire (see for example, Japanese Unexamined Patent Application Publication Nos. H06-262907A and 2006-240507A). However, the measures for combining rolling resistance and wet grip performance are insufficient in either of the proposals and further improvements are required because of the disadvantage of uneven wear occurring easily due to the configuration of soft rubber in the center region in Japanese Unexamined Patent Application Publication No. H06-262907A, and the disadvantage of poor rolling resistance due to the disposition of a rubber emphasizing rolling resistance in a center portion and a rubber emphasizing wet grip performance in the shoulder portion in Japanese Unexamined Patent Application Publication No. 2006-240507A.

SUMMARY

The present technology provides a pneumatic tire that combines rolling resistance and wet grip performance while suppressing the occurrence of uneven wear in order to resolve the above conventional problems.

A pneumatic tire of the present technology has the following configuration (1).

(1) A pneumatic tire having: at least two main grooves extending in the tire circumferential direction formed in a tread portion; a cap rubber that configures the tread portion divided into a center portion that straddles the tire equator line and shoulder portions positioned on both sides thereof; compounds having different physical properties disposed in the center portion and both the shoulder portions; wherein, the pneumatic tire is characterized in that boundary surfaces of the center portion and both the shoulder portions are positioned on the respective tire equator line sides of outermost main grooves positioned nearest to the shoulder sides among the main grooves; the width of the center portion is set to be within a range of 20% to 70% of a tire ground contact width centered on the tire equator line; at least one circumferential narrow groove that extends in the tire circumferential direction on the shoulder side of each of the outermost main grooves is formed in both the shoulder portions; a compound with a tan δ at 0° C. that is higher than that of a compound in both the shoulder portions is disposed in the center portion while a compound with a tan δ at 60° C. that is lower than the compound in the center portion is disposed in both the shoulder portions; and a JIS A hardness of the compounds in the center portion and in both the shoulder portions exceeds 60 and a difference in the JIS A hardness between the compound in the center portion and the compound in both the shoulder portions is three or less.

Moreover, any of the following configurations (2) to (7) are desirable in the above configuration.

(2) The compounds in the pneumatic tire described in (1) above are characterized in that a compound having a tan δ at 0° C. of 0.4 or more and a tan δ at 60° C. of 0.1 to 0.35 is disposed in the center portion, and a compound having a tan δ at 0° C. of 0.3 to 0.6 and a tan δ at 60° C. of 0.2 or less is disposed in both the shoulder portions.

(3) The pneumatic tire described in (1) or (2) above is characterized in that a center line of the circumferential narrow groove is disposed further to the tire equator line than a position corresponding to 105% of the tire ground contact width centered on the tire equator line, and an opening width of the circumferential narrow groove is 0.5 to 3.0 mm and the depth thereof is less than the depth of the outermost main grooves.

(4) The pneumatic tire according to any of (1) to (3) above is characterized in that the boundary surfaces between the center portion and both shoulder portions are positioned toward the tire equator line side at a distance that is spaced 20% or more of the opening width of the outermost main grooves away from the groove walls on the tire equator line sides of the outermost main grooves.

(5) The pneumatic tire according to any of (1) to (4) above is characterized in that the center lines of the outermost main grooves are positioned within a range of 40% to 70% of the tire ground contact width centered on the tire equator line.

(6) The pneumatic tire according to any of (1) to (5) above is characterized in that the boundary surfaces between the center portion and both shoulder portions are each formed on a surface approximately parallel to the tire radial direction when seen in the tire meridian cross-section.

(7) The pneumatic tire according to any of (1) to (5) above is characterized in that the boundary surfaces between the center portion and both shoulder portions are each formed on an inclined surface of a shape in which the width of the center portion gradually increases from the outside toward the inside in the tire radial direction when seen in the tire meridian cross-section.

According to the pneumatic tire of the present technology as in (1), the cap rubber that configures the tread portion is divided into a center portion that straddles the tire equator line and shoulder portions positioned on both sides thereof, the boundary surfaces between the center portion and both shoulder portions are positioned on the respective tire equator line sides of the outermost main grooves, and in addition to the width of the center portion being set to be within a range of 20% to 70% of the tire ground contact width, a compound emphasizing wet grip performance with a tan δ at 0° C. that is higher than that of the shoulder portions is disposed in the center portion where the contact pressure with the road surface is high while the tire is traveling, whereby grip characteristics on wet road surfaces are improved and at the same time rolling resistance is effectively improved due to a compound emphasizing rolling resistance with a tan δ at 60° C. that is lower than that of the center portion being disposed in both shoulder portions that include the vicinities of the outermost main grooves subject to a large deformation while the tire is traveling.

Moreover, since compounds having a JIS A hardness over 60 are disposed in the center portion and both shoulder portions, uneven wear on the tread surface can be suppressed while a change in the rigidity at the boundaries between the center portion and both shoulder portions is suppressed since the difference in the JIS A hardness between the center portion and both shoulder portions is three or less, thus eliminating factors for the generation of cracks and the generation of step wear.

Moreover, since circumferential narrow grooves that extend in the tire circumferential direction are formed on the respective shoulder sides of the outermost main grooves in the left and right shoulder portions, deformation of a buttress portion having a large loss of viscosity during tire deformation is alleviated and the effect of improving rolling resistance is increased by enabling the groove width while the tire is traveling of the circumferential narrow grooves to be changed.

DETAILED DESCRIPTION

Embodiments of a pneumatic tire according to the present technology will be described in detail with reference to the accompanying drawings.

Figure 1:
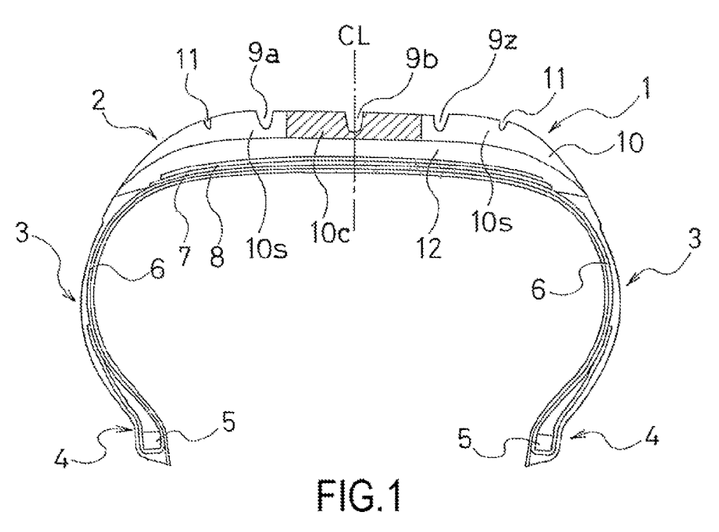
FIG. 1 is a meridian cross-sectional view illustrating an example embodiment of the pneumatic tire of the present technology.
Figure 2:
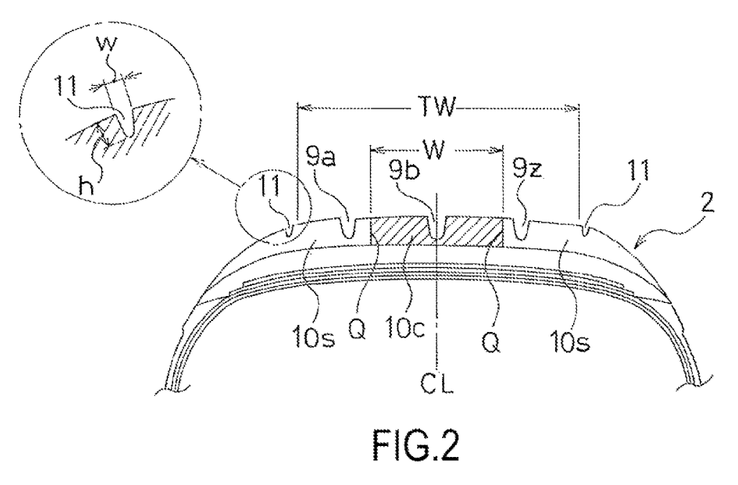
FIG. 2 is a meridian cross-sectional view of a main portion in which a tread portion of the pneumatic tire of the present technology illustrated in FIG. 1 is taken out and illustrated.

FIG. 1 is a meridian cross-sectional view illustrating an example embodiment of the pneumatic tire according to the present technology and FIG. 2 is a meridian cross-sectional view in which the tread portion of the pneumatic tire illustrated in FIG. 1 is taken out and illustrated.

As exemplified in FIG. 1, a pneumatic tire 1 of the present technology is provided with a carcass layer 6 that extends from a tread portion 2 over side wall portions 3, 3 to bead cores 5, 5 embedded in a pair of left and right bead portions 4, 4, and belt layers 7, 8 disposed on the outer circumferential side of the carcass layer 6, and at least two main grooves (three are illustrated in the drawings) 9a, 9b, 9z extending in the tire circumferential direction are formed in the tread portion 2.

A cap rubber 10 that configures the tread portion 2 is divided into a center portion 10c that straddles a tire equator line CL and shoulder portions 10s, 10s positioned on both sides thereof, and rubber compositions with different physical properties are disposed in the center portion 10c and both shoulder portions 10s, 10s. The reference number 12 in the drawings indicates a base rubber. In the present technology as illustrated in FIG. 2, boundary surfaces Q, Q between the center portion 10c and both shoulder portions 10s, 10s are positioned on the respective tire equator line CL sides of the outermost main grooves 9a, 9z which are positioned nearest to the shoulder sides among the main grooves 9a, 9b, 9z; a width W of the center portion 10c is set to be within a range of 20% to 70% of a tire ground contact width TW centered on the tire equator line CL, or preferably a range of 30% to 60%; and at least one circumferential narrow groove 11, 11 (one is illustrated in the drawings) extending in the tire circumferential direction is formed in both shoulder portions 10s, 10s on the shoulder sides of the outermost main grooves 9a, 9z.

Further, a compound in which the tan δ at 0° C. is higher than that of a compound in both shoulder portions 10s, 10 s is disposed in the center portion 10c, while a compound in which the tan δ at 60° C. is lower than that of the center portion 10c is disposed in both shoulder portions 10s, 10s, and the JIS A hardness of the compounds in the center portion 10c and in both shoulder portions 10s, 10s exceeds 60 and preferably is 75 or less, while the difference between the JIS A hardness of the compound in the center portion 10c and the JIS A hardness of the compound in both shoulder portions 10s, 10s is three or less.

Accordingly, the cap rubber 10 is divided into the center portion 10c that straddles the tire equator line CL and the shoulder portions 10s, 10s positioned on both sides thereof, the boundary surfaces Q, Q between the center portion 10c and both shoulder portions 10s, 10s are positioned on the respective tire equator line CL sides of the outermost main grooves 9a, 9z, and in addition to the width W of the center portion 10c being set to be within a range of 20% to 70% of the tire ground contact width TW, a compound emphasizing wet grip performance with a tan δ at 0° C. that is higher than that of the shoulder portions 10s, 10s is disposed in the center portion 10c where the contact pressure with the road surface is high while the tire is traveling, whereby grip characteristics on wet road surfaces are improved, and at the same time rolling resistance is effectively improved due to a compound emphasizing rolling resistance with a tan δ at 60° C. that is lower than that of the center portion 10c being disposed in both shoulder portions 10s, 10s including the vicinities of the outermost main grooves 9a, 9z in which a large deformation occurs while the tire is traveling.

Moreover, since the compounds each having a JIS A hardness over 60 are disposed in the center portion 10c and both shoulder portions 10s, 10s, uneven wear on the tread surface can be suppressed while a change in the rigidity at the boundary surfaces Q, Q between the center portion 10c and both shoulder portions 10s, 10s is suppressed since the difference in the JIS A hardness between the center portion 10c and both shoulder portions 10s, 10s is three or less, thus eliminating factors for the generation of cracks and the generation of step wear.

Moreover, since the circumferential narrow grooves 11, 11 that extend in the tire circumferential direction are formed on the respective shoulder sides of the outermost main grooves 9a, 9z in the left and right shoulder portions 10s, 10s, deformation of a buttress portion having a large loss of viscosity during tire deformation is alleviated and the effect of improving rolling resistance is increased by enabling the groove width while the tire is traveling of the circumferential narrow grooves 11, 11 to be changed.

Weighting between the rolling resistance and the wet grip performance in the pneumatic tire 1 of the present technology comprising the aforementioned configuration can be freely set by optionally changing the width W of the center portion 10c within the range of 20% to 70% with regard to the tire ground contact width TW. If the width W of the center portion 10c is less than 20% of the tire ground contact width TW, the improvement effect of the wet grip performance is insufficient, and if the width W exceeds 70% of the tire ground contact width TW, the improvement effect of the rolling resistance is insufficient.

The tan δ at 0° C. in the present technology refers to a value measured under the conditions of a temperature of 0° C., a frequency of 20 Hz, a static distortion of 10% and a dynamic distortion of ±2% when using a viscoelastic spectrometer (manufactured by Toyo Seiki Seisaku-sho, Ltd.) conforming to JIS K 6394, and the tan δ at 60° C. is a value measured under the same conditions at a temperature of 60° C. Moreover, JIS A hardness refers to rubber hardness according to type A when measured using a durometer tester conforming to JIS K 6253.

Moreover, the tire ground contact width TW refers to the maximum linear distance in the width direction of the tire ground contact patch when a tire is fitted onto a regular rim, inflated to an air pressure of 230 kPa, and subjected to a load corresponding to 75% of the maximum load capacity according to JATMA standards.

Figure 3A:
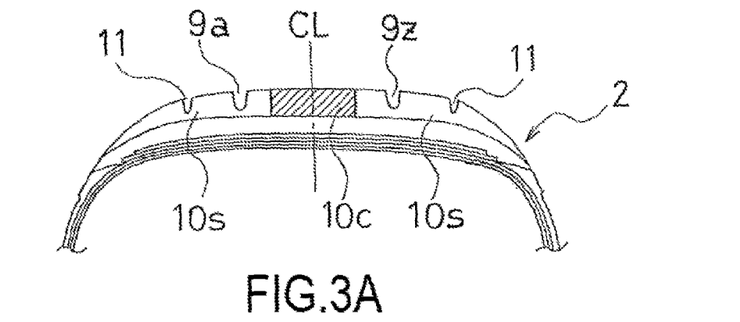
FIG. 3A to 3C illustrate other embodiments of the pneumatic tire of the present technology and are meridian cross-sectional views of the main portion corresponding to FIG. 2.
Figure 3B:
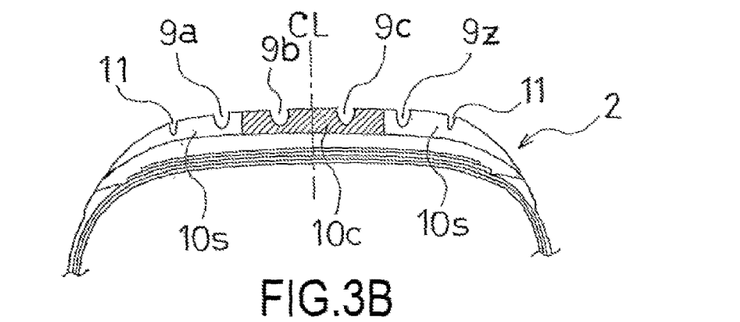

While an example in which three main grooves 9a, 9b, 9z extending in the tire circumferential direction are formed in the tread portion 2 is illustrated in the embodiment illustrated in FIG. 1 and FIG. 2, the number of main grooves formed in the tread portion 2 is not limited to this example in the present technology and two main grooves 9a, 9z, four main grooves 9a, 9b, 9c, 9z, or five or more main grooves 9a, 9b, ..., 9z may be formed as exemplified in FIG. 3A and 3B.

The compound in the present technology disposed in the center portion 10c preferably has a tan δ at 0° C. of 0.4 or more, or more preferably 0.5 to 0.95, and preferably has a tan δ at 60° C. of 0.1 to 0.35, or more preferably 0.1 to 0.2, and the compound disposed in both shoulder portions 10s, 10s preferably has a tan δ at 0° C. of 0.3 to 0.6, or more preferably 0.4 to 0.6, and preferably has a tan δ at 60° C. of 0.2 or less, or more preferably 0.15 or less. As a result, a good balance in both rolling resistance and wet grip performance can be achieved.

Furthermore, the center lines of the circumferential narrow grooves 11, 11 are preferably positioned on the tire equator line CL side of a position corresponding to 105% of the tire ground contact width TW centered on the tire equator line CL, the opening width W of the circumferential narrow grooves 11, 11 is preferably 0.5 to 3.0 mm, and the groove depth h thereof is preferably less than the groove depth of the outermost main grooves 9a, 9z. As a result, the improvement effect of rolling resistance can be effectively increased while preventing the occurrence of cracks starting from the vicinities of the circumferential narrow grooves 11, 11.

If the opening width W of the circumferential narrow grooves 11 is less than 0.5 mm, the improvement effect of rolling resistance is insufficient, and if the opening width W thereof exceeds 3.0 mm, rigidity in the shoulder portions 10s is reduced which leads to a reduction in steering stability. Moreover, if the groove depth h of the circumferential narrow grooves 11 is greater than the groove depth of the outermost main grooves 9a, 9z, rigidity in the shoulder portions 10s is reduced and cracks starting from the bottom of the grooves occur more easily which leads to a reduction in durability.

While the circumferential narrow grooves 11, 11 are exemplified as being formed on the shoulder side of the tire ground contact edge in the embodiments illustrated in FIG. 1 and FIG. 2, the circumferential narrow grooves 11, 11 may be formed on the tire equator line CL side in proximity to the tire ground contact edge.

The boundary surfaces Q, Q between the center portion 10c and both shoulder portions 10s, 10s are preferably positioned toward the tire equator line CL at a distance that is spaced 20% or more of the opening width of the outermost main grooves 9a, 9z away from the groove walls on the tire equator line CL sides of the outermost main grooves 9a, 9z in the present technology. As a result, the vicinities of the outermost main grooves 9a, 9z having a large loss of viscosity can be surrounded by the compound with the low tan δ at 60° C. whereby rolling resistance can be reliably improved.

More preferably, in the present technology, the center lines of the outermost main grooves 9a, 9z are positioned within a range of 40% to 70%, or more preferably 50% to 65%, of the tire ground contact width TW centered on the tire equator line CL. As a result, an even better balance in both rolling resistance and wet grip performance can be achieved.

Figure 3C:
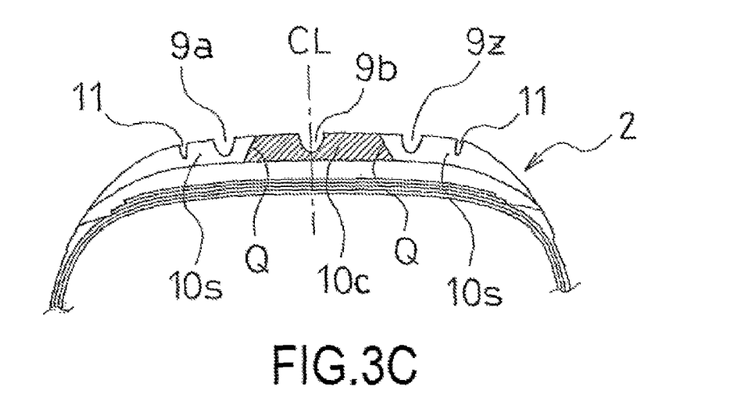

The boundary surfaces Q, Q between the center portion 10c and both shoulder portions 10s, 10s in the pneumatic tire 1 of the present technology may be each formed either on a surface approximately parallel to the tire radial direction when seen in a tire meridian cross-sectional view as illustrated in FIG. 2, or on an inclined surface generated by the width W of the center portion 10c increasing gradually from the outside toward the inside in the tire radial direction as illustrated in FIG. 3C. When the boundary surfaces Q, Q are each formed on the inclined surface as described above, even if tire wear advances and water discharge performance decreases, the width W of the center portion 10c made up of the compound emphasizing wet traction performance and exposed at the tread surface increases whereby a desirable wet traction performance can be assured and thus the disposition of the boundary surfaces Q, Q can be desirably applied to a tire emphasizing wet traction performance.

As described above, because the pneumatic tire of the present technology has the cap rubber that is divided into the center portion straddling the tire equator line and shoulder portions positioned on both sides thereof, and the compound emphasizing wet grip performance and having a tan δ at 0° C. higher than that of the shoulder portions is disposed in the center portion, and the compound emphasizing rolling resistance and having a tan δ at 60° C. lower than that of the center portion is disposed in both shoulder portions, a combination of rolling resistance and wet grip performance is achieved and thus superior effects are demonstrated with a simple configuration, and thus the pneumatic tire of the present technology can be widely applied to a tire for improving braking and driving performance on wet road surfaces in a low fuel consumption tire.

EXAMPLES

A conventional tire (Conventional Example) in which the cap tread compound is configured with a compound emphasizing rolling resistance and having a low tan δ at 60° C., and tires of the present technology (Working Examples 1 to 4) and comparative tires (Comparative Examples 1 to 5) in which forms of the compound disposition in the cap tread, physical properties of the compounds disposed in the tread portion and both shoulders, and the presence of the circumferential narrow grooves and the specifications thereof are all different as described in Table 1 were manufactured using a tire size of 195/65R15 and the tire structure illustrated in FIG. 1. The tires shared the same specifications except for the specifications in Table 1.

The ten types of tires were evaluated for rolling resistance, wet grip performance, and uneven wear characteristics with the following methods and the results were listed in Table 1 using an index of 100 for the conventional tire. Larger numerical values indicate superior performance.

Note that, in Table 1, the compound emphasizing rolling resistance and having a low tan δ at 60° C. is referred to as a "low-heat build-up rubber" and the compound emphasizing wet grip performance and having a high tan δ at 0° C. is referred to as a "high-heat build-up rubber". In the "low-heat build-up rubber and high-heat build-up rubber disposition" row in Table 1, "low" refers to the "low-heat build-up rubber" and "high" refers to the "high-heat build-up rubber" and the disposition relationship in the tire width direction between the "low-heat build-up rubber" and the "high-heat build-up rubber" is represented in the horizontal direction.

Moreover, the ratio of occupancy of the widths of the "low-heat build-up rubber" and the "high-heat build-up rubber" in the tire ground contact width is represented simply by "ground contact width ratio (%)".

(Rolling Resistance Evaluation)

The tires were each assembled on a rim (size: 15×6J) and inflated to an air pressure of 210 kPa. Then, the tires were subjected to a load of 4.82 kN, and subjected to a preliminary run for 30 minutes at a speed of 80 km/h using an indoor drum testing machine (drum radius: 854 mm) before undergoing the rolling resistance measurements, and rolling resistance was evaluated using the inverses of the results.

(Wet Grip Performance Evaluation)

The tires were each assembled on a rim (size: 15×6J), inflated to an air pressure of 180 kPa, and then mounted on the front and rear wheels of a μ-S evaluation vehicle. The tires were then traveled on a test course made up of a wet road surface under a load of 4.52 kN and at a speed of 65 km/h. The coefficient of friction obtained when the brake was applied was measured and the highest value thereof was used for evaluating the wet grip performance.

(Uneven Wear Characteristics Evaluation)

The tires were each assembled on a rim (size: 15×6J), inflated to an air pressure of 210 kPa, and mounted on the front and rear wheels of a domestic vehicle, and after being traveled for 10,000 km at an average speed of 70 km/h on a test course made up of a dry road surface, the amount of remaining groove of the main grooves in the center portion and the amount of remaining groove of the main grooves in the shoulder portions were measured, and uneven wear characteristics were evaluated using the ratio of the amount of remaining groove of the main grooves in the shoulder portions versus the amount of remaining groove of the main grooves in the center portion.

TABLE 1

|  |  | Conventional Example | Working Example 1 | Working Example 2 | Working Example 3 | Working Example 4 |
|---|---|---|---|---|---|---|
| Low-heat build-up rubber and high-heat build-up rubber disposition |  | Low/Low/Low | Low/High/Low | Low/High/Low | Low/High/Low | Low/High/Low |
| Low-heat build-up rubber | Ground contact width ratio (%) | 100 | 70 | 70 | 70 | 40 |
|  | tan δ@60° C. | 0.17 | 0.17 | 0.09 | 0.09 | 0.17 |
|  | tan δ@ 0° C. | 0.36 | 0.36 | 0.32 | 0.32 | 0.36 |
|  | JIS A hardness | 62 | 62 | 62 | 63 | 62 |
| High-heat build-up rubber | Ground contact width ratio (%) | 0 | 30 | 30 | 30 | 60 |
|  | tan δ@60° C. | — | 0.21 | 0.28 | 0.28 | 0.21 |
|  | tan δ@ 0° C. | — | 0.48 | 0.67 | 0.67 | 0.48 |
|  | JIS A hardness | — | 61 | 61 | 62 | 61 |
| Circumferential direction narrow groove | Groove width (mm) | — | 0.7 | 0.7 | 1.2 | 0.7 |
|  | Groove depth (mm) | — | 2.0 | 2.0 | 3.0 | 2.0 |
|  | Ratio of spacing to ground contact width (%) | — | 80 | 80 | 95 | 80 |
| Evaluation | Rolling resistance | 100 | 103 | 105 | 106 | 100 |
|  | Wet grip performance | 100 | 106 | 114 | 115 | 108 |
|  | Uneven wear characteristics | 100 | 100 | 100 | 100 | 100 |

|  |  | Comparative Example 1 | Comparative Example 2 | Comparative Example 3 |
|---|---|---|---|---|
| Low-heat build-up rubber and high-heat build-up rubber disposition |  | High/High/High | High/Low/High | Low/High/Low |
| Low-heat build-up rubber | Ground contact width ratio (%) | 0 | 46 | 25 |
|  | tan δ@60° C. | — | 0.17 | 0.17 |
|  | tan δ@ 0° C. | — | 0.36 | 0.36 |
|  | JIS A hardness | — | 61 | 62 |

TABLE 1-continued

| | | | | |
|---|---|---|---|---|
| High-heat build-up rubber | Ground contact width ratio (%) | 100 | 54 | 75 |
| | tan δ@60° C. | 0.21 | 0.21 | 0.21 |
| | tan δ@ 0° C. | 0.48 | 0.48 | 0.48 |
| | JIS A hardness | 62 | 62 | 61 |
| Circumferential direction narrow groove | Groove width (mm) | 0.7 | 0.7 | 0.7 |
| | Groove depth (mm) | 2.0 | 2.0 | 2.0 |
| | Ratio of spacing to ground contact width (%) | 80 | 80 | 80 |
| Evaluation | Rolling resistance | 90 | 95 | 98 |
| | Wet grip performance | 110 | 108 | 107 |
| | Uneven wear characteristics | 100 | 100 | 100 |

| | | Comparative Example 4 | Comparative Example 5 |
|---|---|---|---|
| Low-heat build-up rubber and high-heat build-up rubber disposition | | Low/High/Low | Low/High/Low |
| Low-heat build-up rubber | Ground contact width ratio (%) | 70 | 70 |
| | tan δ@60° C. | 0.17 | 0.17 |
| | tan δ@ 0° C. | 0.36 | 0.36 |
| | JIS A hardness | 65 | 62 |
| High-heat build-up rubber | Ground contact width ratio (%) | 30 | 30 |
| | tan δ@60° C. | 0.21 | 0.21 |
| | tan δ@ 0° C. | 0.48 | 0.48 |
| | JIS A hardness | 58 | 61 |
| Circumferential direction narrow groove | Groove width (mm) | 0.7 | — |
| | Groove depth (mm) | 2.0 | — |
| | Ratio of spacing to ground contact width (%) | 80 | — |
| Evaluation | Rolling resistance | 101 | 98 |
| | Wet grip performance | 108 | 106 |
| | Uneven wear characteristics | 95 | 100 |

It can be seen in Table 1 that the tire of the present technology maintains desirable uneven wear characteristics while exhibiting an improved balance between the rolling resistance and the wet grip performance in comparison to the conventional tire and to the comparative tires.

It was confirmed that: the Comparative Example 1 demonstrated poor rolling resistance due to the compound in the cap tread being configured with the high-heat build-up rubber; the Comparative Example 2 demonstrated poor rolling resistance due the low-heat build-up rubber being disposed in the center portion and the high-heat build-up rubber being disposed in both shoulder portions; the Comparative Example 3 demonstrated poor rolling resistance due to the width of the high-heat build-up rubber disposed in the center portion being too wide; the Comparative Example 4 demonstrated poor uneven wear characteristics due to the JIS A hardness of the high-heat build-up rubber disposed in the center portion being too low; and the Comparative Example 5 was affected by the high-heat build-up rubber being disposed in the center portion and thus demonstrated poor rolling resistance due to the circumferential narrow grooves being not formed in the shoulder portions.

The contents of the low-heat build-up rubber and the high-heat build-up rubber in the tire of the Working Example 2 are described in Table 2 as a blending example of the compounds of the aforementioned low-heat build-up rubber and the high-heat build-up rubber.

TABLE 2

| Composition | Low-heat build-up rubber | High-heat build-up rubber | |
|---|---|---|---|
| SBR | 70.0 parts by weight | 85.0 parts by weight | Solution polymerized styrene butadiene rubber (manufactured by Asahi Kasei Chemicals Corporation, Tafuden E581) |
| BR | 30.0 | 15.0 | Non-oil-extended butadiene rubber (manufactured by Zeon Corporation, Nipol BR1220) |
| Silica | 50.0 | 80.0 | Manufactured by Rhodia Inc., Zeosil 1165MP |
| Carbon black | 10.0 | 10.0 | Manufactured by Tokai Carbon Co., Ltd., Seast KH |

TABLE 2-continued

| Composition | Low-heat build-up rubber | High-heat build-up rubber | |
|---|---|---|---|
| Silane coupling agent | 4.0 | 7.2 | Sulfur-containing silane coupling agent (manufactured by Evonik Degussa Co., Ltd., Si 69) |
| Zinc oxide | 3.0 | 3.0 | Manufactured by Seido Chemical Industry Co., Ltd., Zinc oxide #3 |
| Stearic agent | 2.0 | 2.0 | Manufactured by NOF Corporation, Beads Stearic Acid YR |
| Antiaging agent | 2.0 | 2.0 | Manufactured by Flexsys Inc., Santoflex 6PPD |
| Wax | 2.0 | 2.0 | Manufactured by Ouchi Shinko Chemical Industrial Co., Ltd., Sannorac |
| Processing aid | 3.0 | 3.0 | Manufactured by Schill & Seilacher Gmbh. & Co., STRUKTOL A50P |
| Oil | 0.0 | 14.5 | Manufactured by Showa Shell Sekiyu K.K., Extract No. 4S |
| Sulfur | 1.8 | 1.8 | Manufactured by Tsurumi Kagaku Kogyo K.K., "Golden Flower" Oil Treated Sulfur Powder |
| Vulcanization accelerator 1 | 2.0 | 2.0 | Vulcanization accelerator CBS (manufactured by Ouchi Shinko Chemical Industrial Co., Ltd., NOCCELER CZ-G) |
| Vulcanization accelerator 2 | 0.5 | 0.5 | Vulcanization accelerator DPG (manufactured by Ouchi Shinko Chemical Industrial Co., Ltd., NOCCELER D) |

The invention claimed is:

1. A pneumatic tire comprising:
two main grooves extending in a tire circumferential direction formed in a tread portion, wherein the tread portion has only two main grooves extending in the tire circumferential direction;
a cap rubber configuring the tread portion divided into a center portion straddling a tire equator line and shoulder portions positioned on both sides thereof; and
compounds having different physical properties disposed respectively in the center portion and both the shoulder portions;
boundary surfaces of the center portion and both the shoulder portions being positioned on respective tire equator line sides of outermost main grooves positioned nearest to shoulder sides among the main grooves;
a width of the center portion being set to be within a range of 20% to 30% of a tire ground contact width centered on the tire equator line;
at least one circumferential narrow groove extending in the tire circumferential direction on a shoulder side of each of the outermost main grooves being formed in both the shoulder portions, the at least one circumferential narrow groove having a depth less than a depth of the outermost main grooves;
a compound with a tan δ at 0° C. higher than a tan δ at 0° C. of a compound in both the shoulder portions being disposed in the center portion while a compound with a tan δ at 60° C. lower than a tan δ at 60° C. of the compound in the center portion being disposed in both the shoulder portions; and
a JIS A hardness of the compounds in the center portion and in both the shoulder portions exceeding 60 and a difference in the JIS A hardness between the compound in the center portion and the compound in both the shoulder portions being three or less.

2. The pneumatic tire according to claim 1, wherein a compound having a tan δ at 0° C. of 0.4 or more and a tan δ at 60° C. of from 0.1 to 0.35 is disposed in the center portion, and a compound having a tan δ at 0° C. of from 0.3 to 0.6 and a tan δ at 60° C. of 0.2 or less is disposed in both the shoulder portions.

3. The pneumatic tire according to claim 2, wherein a center line of the circumferential narrow groove is disposed closer to the tire equator line than a position corresponding to 105% of the tire ground contact width centered on the tire equator line, and an opening width of the circumferential narrow groove is from 0.5 to 3.0 mm and the depth thereof is less than a depth of the outermost main grooves.

4. The pneumatic tire according to claim 2, wherein the boundary surfaces between the center portion and both the shoulder portions are positioned toward the tire equator line side at a distance spaced 20% or more of an opening width of the outermost main grooves away from groove walls on tire equator line sides of the outermost main grooves.

5. The pneumatic tire according to claim 2, wherein center lines of the outermost main grooves are positioned within a range of 40% to 70% of the tire ground contact width centered on the tire equator line.

6. The pneumatic tire according to claim 2, wherein the boundary surfaces between the center portion and both shoulder portions are each formed on a surface approximately parallel to a tire radial direction when seen in a tire meridian cross-section.

7. The pneumatic tire according to claim 2, wherein the boundary surfaces between the center portion and both shoulder portions are each formed on an inclined surface of a shape in which the width of the center portion gradually increases from the outside toward the inside in a tire radial direction when seen in a tire meridian cross-section.

8. The pneumatic tire according to claim 1, wherein a center line of the circumferential narrow groove is disposed closer to the tire equator line than a position corresponding to 105% of the tire ground contact width centered on the tire equator line, and an opening width of the circumferential narrow groove is from 0.5 to 3.0 mm and the depth thereof is less than a depth of the outermost main grooves.

9. The pneumatic tire according to claim 8, wherein the boundary surfaces between the center portion and both the shoulder portions are positioned toward the tire equator line side at a distance spaced 20% or more of the opening width of the outermost main grooves away from groove walls on tire equator line sides of the outermost main grooves.

10. The pneumatic tire according to claim 8, wherein center lines of the outermost main grooves are positioned within a range of 40% to 70% of the tire ground contact width centered on the tire equator line.

11. The pneumatic tire according to claim 8, wherein the boundary surfaces between the center portion and both shoulder portions are each formed on a surface approximately parallel to a tire radial direction when seen in a tire meridian cross-section.

12. The pneumatic tire according to claim 8, wherein the boundary surfaces between the center portion and both shoulder portions are each formed on an inclined surface of a shape in which the width of the center portion gradually increases from the outside toward the inside in a tire radial direction when seen in a tire meridian cross-section.

13. The pneumatic tire according to claim 1, wherein boundary surfaces between the center portion and both the shoulder portions are positioned toward the tire equator line side at a distance spaced 20% or more of an opening width of the outermost main grooves away from groove walls on tire equator line sides of the outermost main grooves.

14. The pneumatic tire according to claim 13, wherein center lines of the outermost main grooves are positioned within a range of 40% to 70% of the tire ground contact width centered on the tire equator line.

15. The pneumatic tire according to claim 13, wherein the boundary surfaces between the center portion and both shoulder portions are each formed on a surface approximately parallel to a tire radial direction when seen in a tire meridian cross-section.

16. The pneumatic tire according to claim 13, wherein the boundary surfaces between the center portion and both shoulder portions are each formed on an inclined surface of a shape in which the width of the center portion gradually increases from the outside toward the inside in a tire radial direction when seen in a tire meridian cross-section.

17. The pneumatic tire according to claim 1, wherein center lines of the outermost main grooves are positioned within a range of 40% to 70% of the tire ground contact width centered on the tire equator line.

18. The pneumatic tire according to claim 17, wherein the boundary surfaces between the center portion and both shoulder portions are each formed on a surface approximately parallel to a tire radial direction when seen in a tire meridian cross-section.

19. The pneumatic tire according to claim 1, wherein the boundary surfaces between the center portion and both shoulder portions are each formed on a surface approximately parallel to a tire radial direction when seen in a tire meridian cross-section.

20. The pneumatic tire according to claim 1, wherein the boundary surfaces between the center portion and both shoulder portions are each formed on an inclined surface of a shape in which the width of the center portion gradually increases from the outside toward the inside in a tire radial direction when seen in a tire meridian cross-section.

* * * * *